United States Patent

Berndt et al.

[11] Patent Number: 5,772,549
[45] Date of Patent: Jun. 30, 1998

[54] BELT TENSIONING DEVICE

[75] Inventors: Thomas Berndt, Hof; Joachim Jud, Daaden; Asmus Koch, Hachenburg; Ulrich Roth, Neunkhausen, all of Germany

[73] Assignee: Muhr und Bender, Attendorn, Germany

[21] Appl. No.: 766,165

[22] Filed: Dec. 12, 1996

[30] Foreign Application Priority Data

Dec. 12, 1995 [DE] Germany .......................... 195 46 207.6
Feb. 1, 1996 [DE] Germany .......................... 196 03 558.9

[51] Int. Cl.[6] .................................................. F16H 7/12
[52] U.S. Cl. ............................................................ 474/135
[58] Field of Search .................................... 474/101, 115, 474/135, 136

[56] References Cited

U.S. PATENT DOCUMENTS 4,344,598  8/1982  Sloyan ................................. 475/115 X
4,351,636  9/1982  Hager ...................................... 474/135
5,030,173  7/1991  Bryant ..................................... 475/136
5,280,309  1/1994  Zinsmeyer et al. ................. 474/101 X

FOREIGN PATENT DOCUMENTS 41 24 636 A1  1/1993  Germany .
43 36 467 A1  5/1994  Germany .
43 25 424 C1  2/1995  Germany .
43 45 150 A1  5/1995  Germany .

Primary Examiner—Roger J. Schoeppel
Attorney, Agent, or Firm—Sixbey,Friedman,Leedom & Ferguson; David S. Safran

[57] ABSTRACT

The invention relates to belt tensioning device (1) with a receiver housing (2), a roller carrier (3) connected to the receiver housing (2), a spring-loaded bearing means (5) between the receiver housing (2) and the roller carrier (3), and a spring element (6) which acts between the receiver housing (2) and the roller carrier (3) for applying a tensioning force. To simplify the structure of belt tensioning device (1) and to cut production costs, according to the invention, the spring element (6) used for spring loading of the bearing means (5) in addition to being used for applying the belt tensioning force to the pulley carrier.

14 Claims, 3 Drawing Sheets

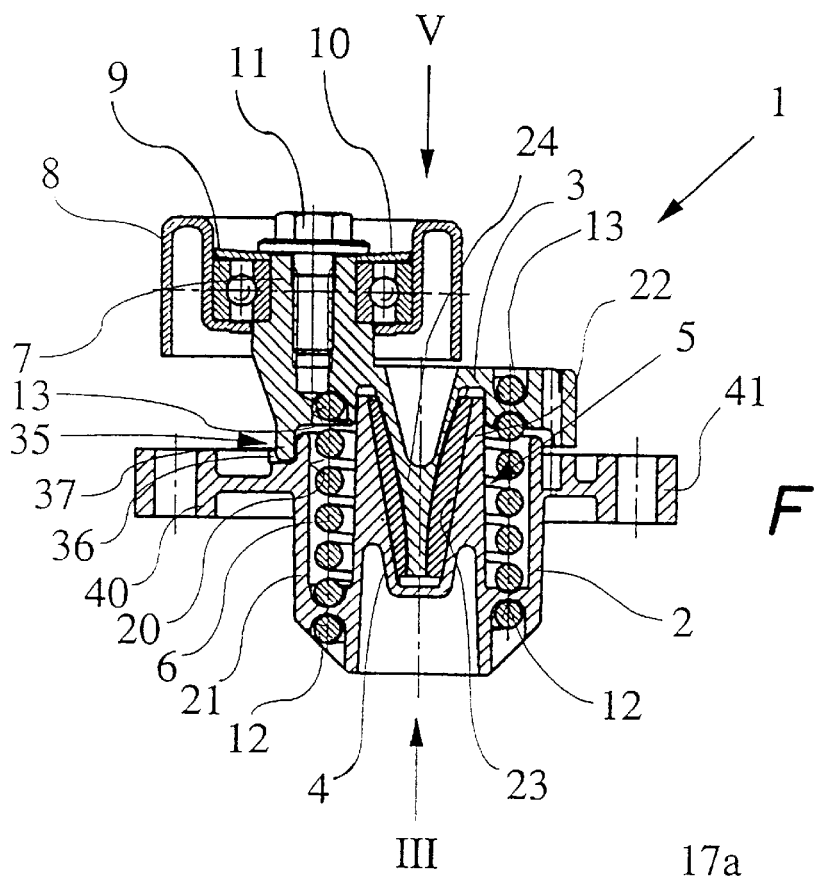
FIG. 2
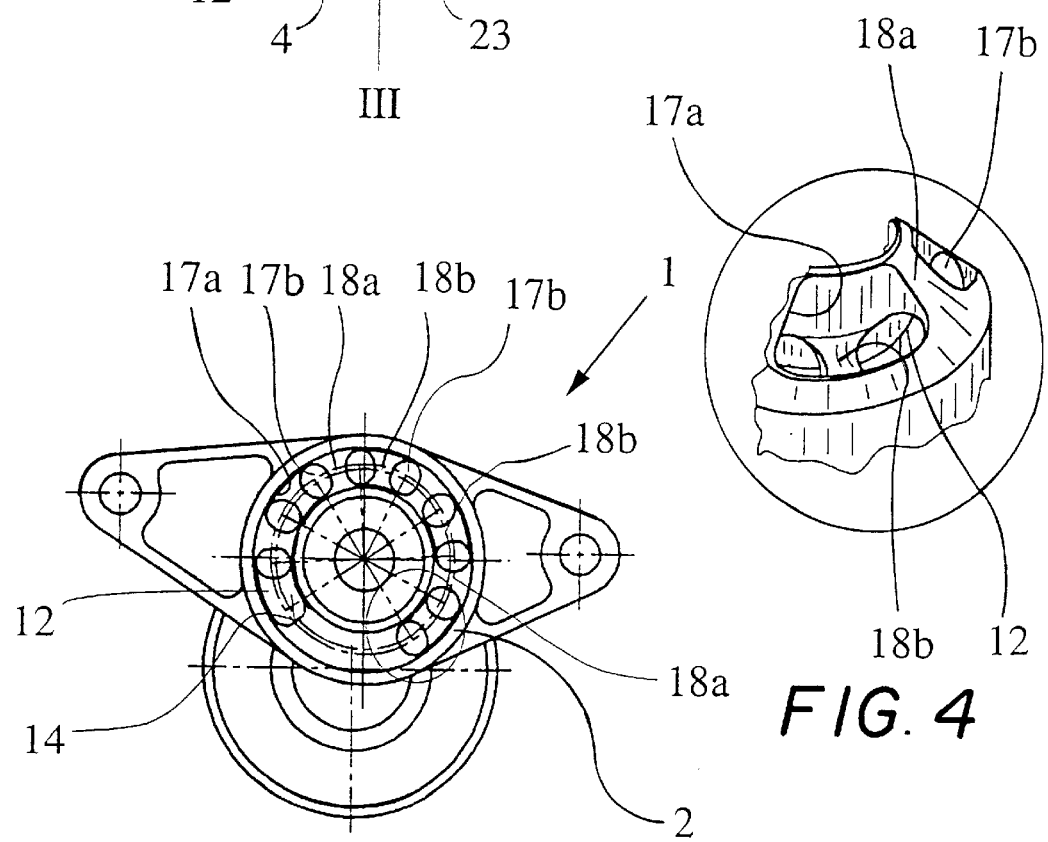
FIG. 3
FIG. 4

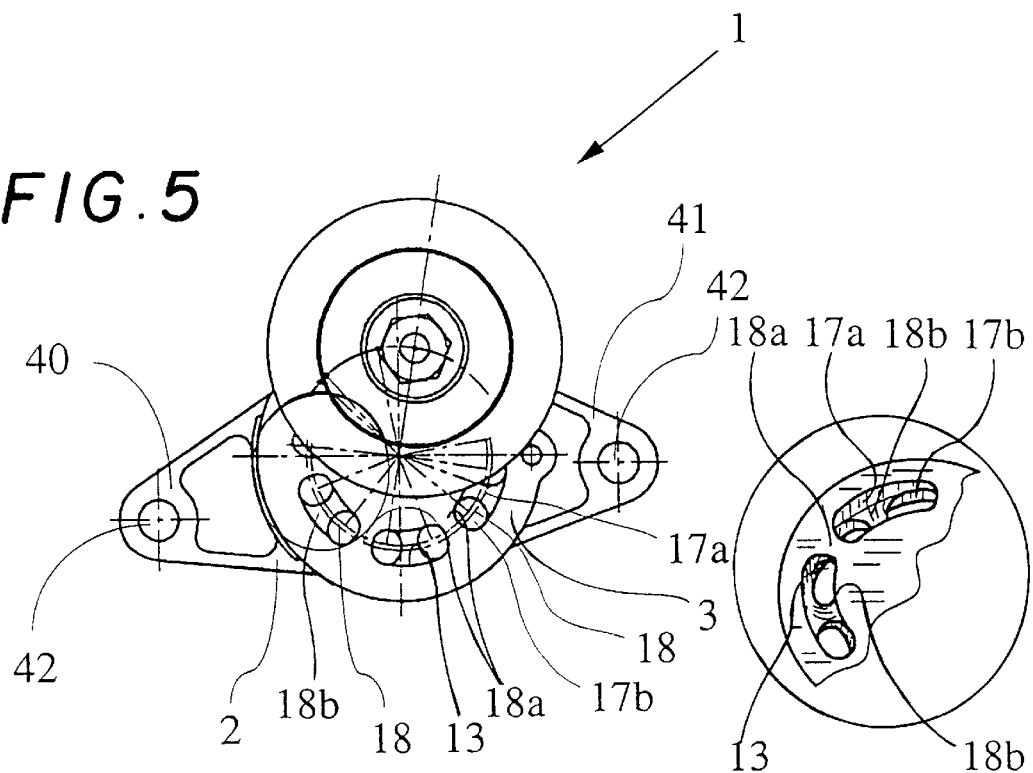
FIG. 5
FIG. 6
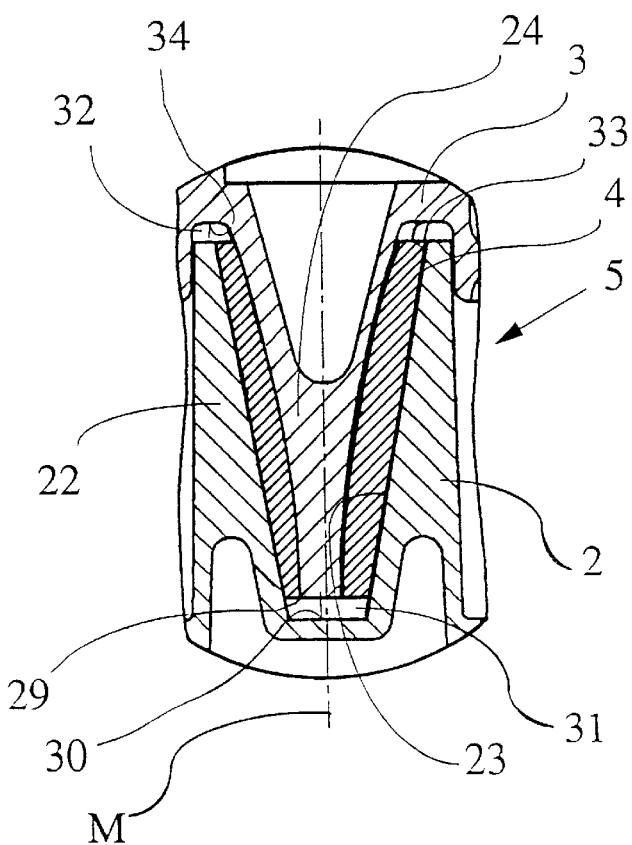
FIG. 7

BELT TENSIONING DEVICE

BACKGROUND OF THE INVENTION

1. Field of the Invention

The present invention relates to a belt tensioning device with a receiver housing, a pulley carrier (also referred to as a roller carrier) connected to the receiver housing, a spring-loaded bearing means between the receiver housing and the pulley carrier, and a spring element which acts between the receiver housing and the pulley carrier for applying a tensioning force.

2. Description of Related Art

In motor vehicles, the engine drives various accessory assemblies, for example, the generator, the pump for water cooling of the vehicle engine, the fan for cooling the coolant, the power steering pump, the compressor for the air-conditioning system, etc. This is done by a main pulley which sits on the engine shaft of the motor vehicle and by an endless drive belt which, on the one hand, runs on the main pulley, and on the other hand, on accessory pulleys which sit on the drive shafts of the accessory assemblies. Adjusting and maintaining the belt tension of the drive belt are of special importance for the serviceability of the accessory assemblies and for the service life of the drive belt. Belt tensioning devices are used for this purpose.

A belt tensioning device of the initially mentioned type is already known from German Patent 43 00 178 C1. In this known belt tensioning device, in the receiver housing is a bottom plate on which a bearing cone consisting of three thrust pieces is located. Turned upside down over the bearing cone is a damping cone on which, in turn, a pulley carrier is seated. The three-part bearing cone is pressed via a compression spring against the damping cone so that there is play-free axial and radial support of the pulley carrier in the receiver housing over the entire service life of the belt tensioning device.

The receiver housing and the pulley carrier are joined to one another via a screw connection. A hexagonal shaft which, on the one hand, is joined to the receiver housing and into which, on the other hand, a screw can be screwed to secure the pulley carrier, is used for this purpose. The hexagonal area of the hexagonal shaft is used, otherwise, as the bearing of the three compression pieces of the bearing cone. A helical or torsion spring with bent ends is used to apply the tension force.

One disadvantage of the prior art is that the known belt tensioning device consists of a comparatively large number of parts and is expensive to build and assemble. Consequently production costs are comparatively high.

SUMMARY OF THE INVENTION

The invention takes a new approach and avoids the aforementioned disadvantages. According to the invention, in the initially mentioned belt tensioning device, it is provided that the spring element for applying the tension force is used, not only for the aforementioned purpose, but also for spring loading of the bearing means. Thus, in the invention, there is considerable simplification and a reduction in the number of parts required, because only a single spring element, which performs two functions at the same time, is required.

As in the prior art, the spring element can be made as a helical spring, and thus, on the one hand, can be joined to the receiver housing, and on the other, to the pulley carrier. Here, in an especially simple embodiment of the invention, it can be provided that the spring element for spring loading of the bearing means exerts a tension force on the receiver housing and the pulley carrier. In this way, the entire system of the belt tensioning device can be made comparatively simple, as will be explained in detail below.

To couple the spring element with the receiver housing and the pulley carrier, it is suggested that a screw-like receiving passage with a corresponding insertion opening for the respective end turns of the spring element be provided in the two aforementioned parts. In order that the spring element can transmit the tension force accordingly, it goes without saying that the receiving passages have ends in which a spring stop is formed.

The aforementioned embodiment with the receiving passages for accomplishing the connection between the receiver housing and the pulley carrier and the spring element can be implemented especially easily, without the need for special bending processes in the production of the spring element, by the distance of the end turns to the adjacent turn being greater than the distance of the adjacent turns to one another. In other words, this means that the end turns are not parallel to the respective adjacent turn, but are at an acute angle to it.

The belt tensioning device according to the invention can be produced especially cost-favorably when the receiver housing and the pulley carrier are made as die castings. In order to be able to easily make the aforementioned receiving passage in the receiver housing and in the pulley carrier during casting, distributed over the length of the receiving passage is a plurality of inner and outer openings or openings which discharge into the receiving passage. Adjacent openings are spaced away from one another via a rib. The respective receiving passage can be shaped especially easily when the outer ribs are arranged offset to the inner ribs. It goes without saying that the aforementioned embodiment can be implemented both on the receiver housing and also on the pulley carrier.

Moreover, to further reduce the number of parts, and thus to ensure an extremely simple structure of the belt tensioning device, according to the invention, it is provided that the receiver housing and the pulley carrier are held together solely by the tension-loaded spring element. A screw connection as provided in the prior art for holding these two parts together is not necessary.

A further simplification of the structure of the belt tensioning device arises by the bearing means having a conical opening which is provided, preferably, in the receiver housing, a separate bearing cone and a conical journal on the pulley carrier on which the bearing cone is seated.

Preferably, the bearing cone is made of flexible plastic and has at least one continuous longitudinal slot, and optionally, a plurality of additional slots which are not continuous. This special material choice and configuration of the bearing cone ensure that it always optimally fits the conical opening or the journal for the axial and radial support. Also, any production tolerances on the conical opening, the journal, or even on the bearing cone itself, can be easily equalized by selected shaping.

Other features, advantages and possible applications of this invention follow from the following description and from the accompanying drawings.

BRIEF DESCRIPTION OF THE DRAWINGS

FIG. 2 is a cross-sectional view of the belt tensioning device according to the invention;

FIG. 3 shows a bottom plan view of the belt tensioning device viewed in the direction of arrow III in FIG. 2;

FIG. 4 shows an enlarged perspective view of the encircled detail in FIG. 3;

FIG. 5 a top plan view of the belt tensioning device viewed in the direction of arrow V in FIG. 2;

FIG. 6 shows an enlarged, perspective view of the encircled detail in FIG. 5; and FIG. 7 is a cross-sectional view of a bearing means of the belt tensioning device according to the invention.

DETAILED DESCRIPTION OF THE PREFERRED EMBODIMENT

Figure 1:
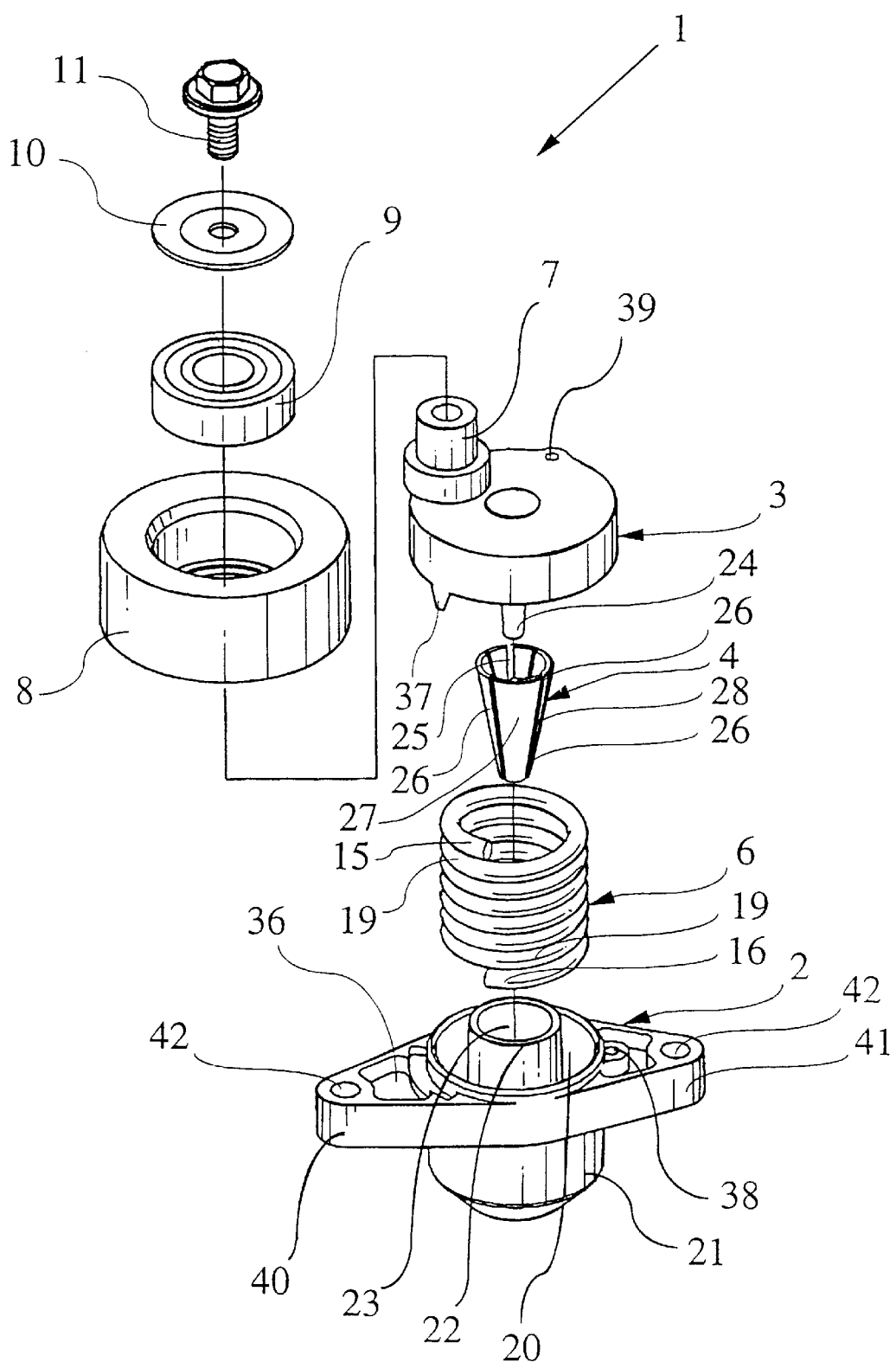
FIG. 1 is an exploded schematic view of a belt tensioning device according to the invention, omitting various different details.

The Belt tensioning device 1 shown in the drawings, as is apparent especially from FIG. 1, as main components, has a receiver housing 2, a pulley carrier 3, a bearing means 5 having a bearing cone 4, and a spring element 6, in the form of a helical or torsion spring, for applying the tensioning force of belt tensioning device 1. In addition, on the pulley carrier 3 is a bearing projection 7 for arrangement of a roller 8, bearing 9, especially a roller bearing, washer 10, and screw 11.

At this point, it is important to note that spring element 6 is used, not only for applying the tensioning force, but also for spring loading of the bearing means 5. Thus, the spring element 6 has a double function. Spring element 6 is joined to receiver housing 2 and pulley carrier 3, for which purpose there is a receiving passage 12 in receiver housing 2, and there is corresponding receiving passage 13 in pulley carrier 3. Each of receiving passages 12, 13 has an end in which a spring stop is formed.

FIG. 3 shows stop 14 of receiving passage 12 in receiver housing 2. Each of receiving passages 12, 13 is accessible via an insertion opening, which is not shown, for the respective end turn 15, 16 of the spring element 6 (FIG. 1). A plurality of openings 17a, 17b discharge on the bottom and top into each of receiving passages 12, 13. Openings 17a, b are each made as longitudinal holes, adjacent openings 17a, 17b being separated from one another via a rib 18a, 18b. Here, outer ribs 18a, which are provided in respective receiving passage 12, 13, are located between outer openings 18a, while inner ribs 18b are located between inner openings 17b. This is especially clear in FIGS. 4 and 6.

FIG. 1 shows an embodiment of spring element 6 in which the end turns 15, 16 have the same distance relative to the adjacent intermediate turn 19 as adjacent intermediate turns 19 have to one another. However, to facilitate insertion of end turns 15, 16 into receiving passages 12, 13, it is especially advantageous if end turns 15, 16 are arranged, not parallel, but at a very acute angle, to adjacent intermediate turns 19. In this way, the end turns 15, 16 stand off from their adjacent turns 19, and therefore, are easily inserted into receiving passages 12, 13.

In the embodiment shown, spring element 6 is tension-loaded in the assembled state, i.e., it exerts a tension action on receiver housing 2 and pulley carrier 3. Bearing means 5 is, thus, designed such that an automatic adjustment effect for zero-play axial and radial bearing is achieved by the loading of the tension spring. Besides applying tension force and spring loading of bearing means 5, the action of the tension spring performs another function of spring element 6 in that the spring element 6 draws the receiver housing 2 and the pulley carrier 3 towards one another, thereby making additional attachment means for joining receiver housing 2 and pulley carrier 3 unnecessary.

Spring element 6 itself is located in the annulus 20 in the receiver housing 2 (which is upwardly open) and which passes into the receiving passage 12 on the front end of the receiver housing 2. Inner openings 17b also proceed from the front of annulus 20. Radially to the outside, the annulus 20 is bordered by an outer wall 21, while it is bordered to the inside by upright projection 22, around which spring element 6 is located. In projection 22, there is a conical opening 23 which is part of bearing means 5.

Furthermore, bearing means 5 includes the above-mentioned bearing cone 4 and the conical journal 24 which is integral with pulley carrier 3, and projects into conical opening 23. Bearing cone 4, itself, is sleeve-shaped, i.e., it is made as a conical sleeve. Here, the outer surface of bearing cone 4 corresponds essentially to the surface of the conical opening, while the inside surface of bearing cone 4 corresponds essentially to the outer surface or shape of journal 24.

Although bearing cone 4 and also journal 24 can be made essentially rotationally symmetrical, in the embodiment shown, a non-rotationally symmetrical configuration of journal 24 and also of bearing cone 4 is shown (see especially FIG. 7). In this embodiment, the thickness of the sleeve-shaped bearing cone 4, is greater on one side of center axis M than on the other side. In other words, this means that the material thickness of bearing cone 4 distributed around the periphery is different. Accordingly journal 24 is weaker on one side than on the other side. In addition, bearing cone 4 has a bulged shape in cross section, to which the shape of journal 24 is matched. This special configuration yields good bearing conditions and also equalization of production tolerances.

Sleeve-shaped bearing cone 4, itself, is made of a flexible plastic, and as is especially apparent from FIG. 1, on the one hand, is provided with a continuous longitudinal slot 25, and on the other hand, with a row of additional slots 26. Additional slots 26 are arranged such that there is a plurality of, for example, four sleeve segments 27, adjacent sleeve segments 27 being joined to one another via a rib 28 which remains between additional slots 26. Of course, this does not apply in the area of longitudinal slot 25.

In the installed state, between outer end 29 of journal 24 and lower end face 30 of conical opening 23 there is empty space 31, while corresponding empty annulus 32 remains between upper edge surface 33 of projection 22 and lower surface 34 on pulley carrier 3. In this way, automatic adjustment is easily possible in the axial direction due to spring element 6 when bearing cone 4 undergoes wear.

Between receiver housing 2 and pulley carrier 3 is a pivot path limit means 35 which has guide groove 36 on the receiver housing 2 and a projection 37 on pulley carrier 3 which fits into guide groove 36. In the inserted state, the maximum possible tension path can be limited by the pivot path limit means 5, and thus, over-tensioning of spring element 6 can be avoided.

In addition, in receiver housing 2 and in pulley carrier 3, there are openings 38, 39 which each correspond to one another. Openings 38, 39 overlap when pulley carrier 3 is moved relative to receiver housing 2 as far against the spring force of spring element 6 as is maximally possible by pivot path limit means 35. Then, an optimum prestressed state is achieved. By inserting a pin (not shown) into openings 38, 39, the belt tensioning device 1 can be locked in this prestressed state, the pin being removed after mounting of the drive belt over the roller 8, thereby releasing the pulley carrier 3 to enable shifting thereof under the action of spring element 6.

Receiver housing 2 and pulley carrier 3 can be produced especially cost favorably as die castings. The production tolerance which may occur in doing so can be easily compensated for by the special bearing cone 4.

Finally, there are two mounting straps 40, 41, on the receiver housing 2, each of which has a corresponding opening 42 for attachment in the engine compartment.

Belt tensioning device 1, according to the invention, acts such that the spring element 6 produces a torque which is transferred to the pulley carrier 3. In this way, in the drive belt (not shown), a side force is generated which, in turn, causes friction between the drive belt and other pulley or roller 8, so that the drive belt runs without slippage on the corresponding pulleys or rollers. Any vibrations in the drive belt are transferred from the latter onto roller and pulley carrier 3 into spring element 6 and are damped by the latter.

While a single embodiment in accordance with the present invention has been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. A belt tensioning device for a motor vehicle comprising:
    a receiver housing;
    a roller carrier connected to the receiver housing;
    a bearing means located between the receiver housing and the roller carrier; and
    a spring element which acts between receiver housing and the roller carrier;
    wherein the spring element is arranged in a manner applying both a belt tensioning force on the roller carrier and the spring loading of the bearing means;
    wherein the bearing means comprises a bearing cone which is joined to one of the receiver housing and the pulley carrier; and wherein a conical opening which corresponds in shape to the bearing cone is provided in the other of the pulley carrier and the receiver housing.

2. A belt tensioning device according to claim 1, wherein the spring element is a helical spring joined to the receiver housing and to the roller carrier.

3. A belt tensioning device according to claim 2, wherein the spring element exerts opposing forces on the receiver housing and the roller carrier.

4. A belt tensioning device according claim 2, wherein a receiving passage is provided in at least one of the receiver housing and the roller carrier, the receiving passage having an end with a spring stop and a first insertion opening for an end turn of the spring element.

5. A belt tensioning device according claim 4, wherein a distance of the end turn from an adjacent, intermediate turn is greater than a distance of adjacent intermediate turns relative to each other.

6. A belt tensioning device according to claim 1, wherein at least one of the receiver housing and the roller carrier is a die casting.

7. A belt tensioning device according to claim 4, wherein a plurality of openings which discharge into the receiving passage are distributed over at least one of opposite sides of an end wall of the receiving passage, adjacent openings of which are separated from one another via a rib.

8. A belt tensioning device according to claim 7, wherein said plurality of openings are provided on both of opposites sides of said end wall; and wherein the ribs between adjacent openings on one of said opposite sides of said end wall are offset relative to the ribs between adjacent openings on the other of said opposite sides of said end wall.

9. A belt tensioning device according to claim 1, wherein the receiver housing and roller carrier are held together solely by said spring element.

10. A belt tensioning device according to claim 1, wherein locking openings for insertion of a locking pin are provided in the receiver housing and in the roller carrier for holding the belt tensioning device in a prestressed state.

11. A belt tensioning device according to claim 1, wherein a conical journal for mounting the bearing cone is provided on said one of the receiver housing or roller carrier; and wherein the bearing cone is sleeve-shaped for seating on said journal.

12. A belt tensioning device according to claim 1, wherein the bearing cone is made of a flexible plastic; and wherein the bearing cone is split by a continuous longitudinal slot and partially split by a plurality of additional slots which are discontinuous.

13. A belt tensioning device according to claim 1, wherein a pivot path limit means is provided between the receiver housing and the roller carrier.

14. A belt tensioning device according to claim 13, wherein the pivot path limit means comprises a guide groove provided in the receiver housing and a projection on the roller carrier which extends into the guide groove.

* * * * *

UNITED STATES PATENT AND TRADEMARK OFFICE
CERTIFICATE OF CORRECTION

PATENT NO. : 5,772,549
DATED : June 30, 1998
INVENTOR(S) : BELT TENSIONING DEVICE It is certified that error appears in the above-identified patent and that said Letters Patent is hereby corrected as shown below:

On the title page, Item [75], please change the inventors name from Uirich Roth to "Ulrich Roth.

Signed and Sealed this

Twenty-ninth Day of December, 1998

Attest:

BRUCE LEHMAN

*Attesting Officer*           Commissioner of Patents and Trademarks